H. E. COSGRAVE.
Hame.
No. 199,033.  Patented Jan. 8, 1878.
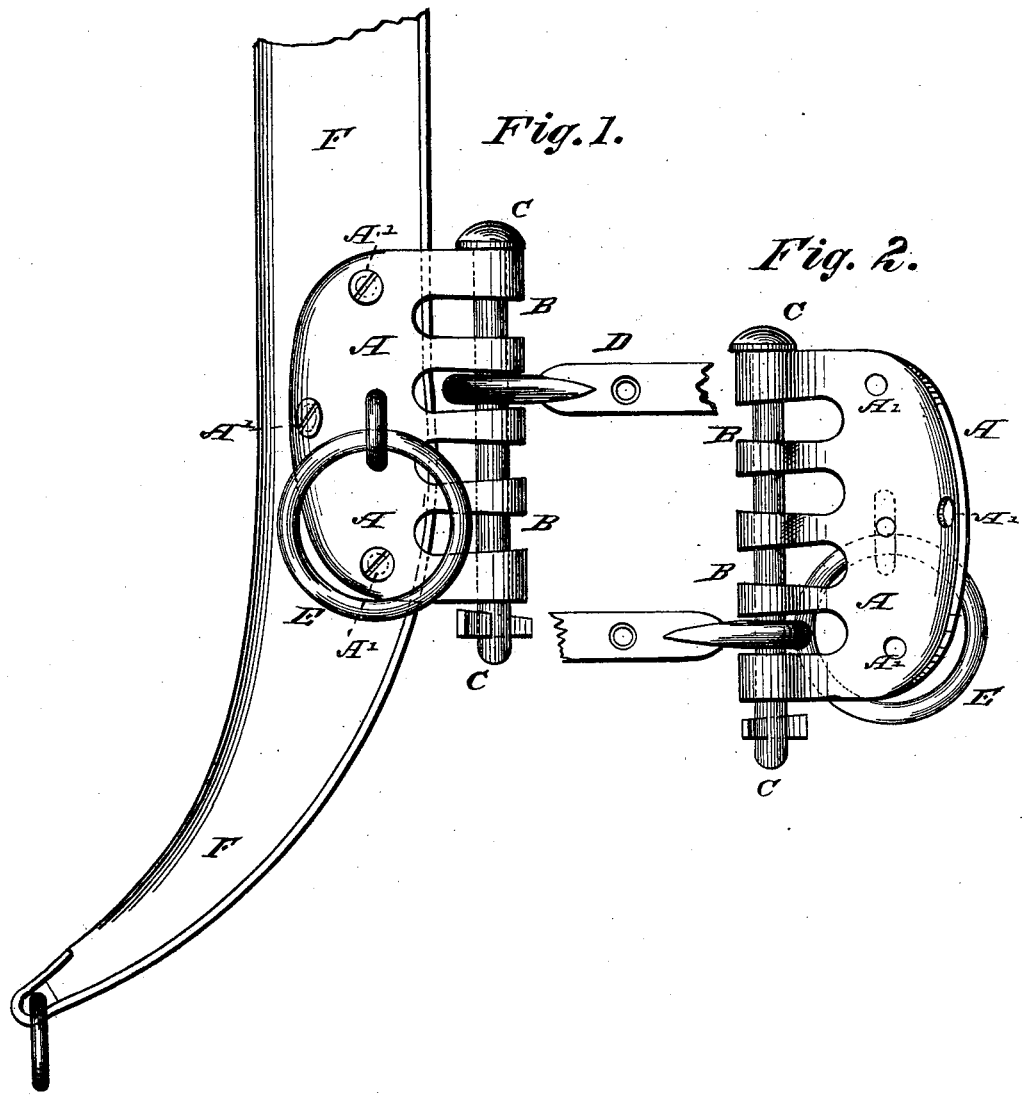

UNITED STATES PATENT OFFICE.

HENRY E. COSGRAVE, OF CAMBRIDGE, OHIO.

IMPROVEMENT IN HAMES.

Specification forming part of Letters Patent No. 199,033, dated January 8, 1878; application filed November 17, 1877.

*To all whom it may concern:*

Be it known that I, HENRY E. COSGRAVE, of Cambridge, in the county of Guernsey and State of Ohio, have invented certain new and useful Improvements in Hames; and I do hereby declare the following to be a full, clear, and exact description of the invention, such as will enable others skilled in the art to which it pertains to make and use it, reference being had to the accompanying drawings, which form part of this specification.

My invention relates to an improvement in hames; and consists in a novel clevis or means of attachment between the hames and the traces of the harness.

In the drawings, Figure 1 is a view of my device as attached to a hame. Fig. 2 is a detached view of the same.

A is a plate formed to fit the shape of the hame, so as to be readily attached thereto by means of screws or rivets A'. This plate A is provided with several loops, B, so constructed as to permit the insertion of a pin or bolt, C, through all of them. These loops B are formed on the longitudinal rear edge of plate A, and are made with an inward lateral curve, as shown in the drawings, so as to bring them in the line of draft; and the plate A is of such relative proportion to, and is secured to the hame so as to cause the loops to project rearward from the latter. This rearward projection of the loops, in connection with the inward lateral curve formation of their bodies, serves to give an easy bearing and direct line draft to the several parts.

As shown in the drawing, when the pin C is placed in position and properly locked, it forms a means of secure attachment to the loop D, to which the trace is attached. This loop D may be placed between any two of the loops B, thereby enabling the point of draft to be raised or lowered, as necessity requires. By means of this provision the draft may be readily regulated to suit animals of different height. To the plate A is also provided means of attachment for the ring E.

I am aware that different forms of devices have been heretofore made which adjust the draft at a higher or lower position upon the hame, and hence I do not broadly claim a construction producing such a result.

Having fully described my invention, what I claim as new, and desire to secure by Letters Patent, is—

The combination, with plate A, having the loops B formed on its rear longitudinal edge, of pin C and trace-loop attachment D, the said loops B being made with inwardly-curved side bodies, and the plate A being secured to the hame, as shown, all substantially as described, whereby the adjustable attachment may project rearward of the hame, and be in the direct line of draft, substantially as set forth.

In testimony whereof I have signed my name to this specification in the presence of two subscribing witnesses.

HENRY E. COSGRAVE.

Witnesses:
JOHN D. PATTERSON,
H. B. HUFFMAN.